United States Patent [19]
Rizzo

[11] Patent Number: 5,330,552
[45] Date of Patent: Jul. 19, 1994

[54] METHOD FOR INCREASING CROP YIELD

[76] Inventor: John M. Rizzo, Rte. 1, Box 3-16, Cleveland, Miss. 38732

[21] Appl. No.: 86,875

[22] Filed: Jul. 8, 1993

[51] Int. Cl.$^5$ ............................................. C05C 9/00
[52] U.S. Cl. ........................................... 71/30; 71/903
[58] Field of Search ....................... 71/1, 30, 903, 904, 71/63

[56]         References Cited
         U.S. PATENT DOCUMENTS 3,785,796  1/1974  Mann, Jr. ................................ 71/28
4,943,308  7/1990  Vanmarcke et al. .................... 71/29

OTHER PUBLICATIONS

Kanwar et al, Fertilizer Sulfur and Food Production, p. 29, 1986.

Primary Examiner—Ferris Lander
Attorney, Agent, or Firm—Richard C. Litman

[57] ABSTRACT

A method for increasing the yield of rice crop plants by foliar application to the plants during the plant growth stage a granular fertilizer consisting essentially of urea and ammonium sulfate in a urea/ammonium sulfate. The granular fertilizer has a urea/ammonium sulfate weight ratio of about 4/1 and contains at least 40% nitrogen and at least 4% sulfur. The relatively high N-S fertilizer is applied at relatively high rates of about 100 to 150 pounds per acre to ensure that the fertilizer nutrients are always available to the rice plants at several stages of their growing period.

7 Claims, No Drawings

METHOD FOR INCREASING CROP YIELD

BACKGROUND OF THE INVENTION

1. Field Of The Invention

The present invention relates to a method for increasing the yield of crops by application of a granular fertilizer having a relatively high nitrogen and sulfur content. More particularly, the invention pertains to the use of a N-S granular fertilizer containing urea and ammonium sulfate in specific proportions to increase the yield of rice and other field crops.

2. Description Of The Prior Art

Rice, the cereal grass *Oryza satira*, is one of the most important food crops cultivated throughout the world. The starchy edible seed of rice provides the principal food for millions of people whose diet depends on its availability. The continued increase of the world's population and concomitant food shortage increase the need for improvements in the production of this staple crop.

The proportion of rice grown in the United States relative to worldwide rice production is small but is steadily increasing, especially in Texas, Mississippi, Louisiana, Alabama and Tennessee. Recent increased cultivation of rice in the southern USA may be attributed to the widespread use of herbicides and pesticides which are utilized to eliminate unwanted weeds and insect pests. Unchecked weed growth, for example, can cause a significant decrease in crop yield and reduce profits for the farmers. However, it can be appreciated that extensive use of herbicides and pesticides increases the overall crop production costs and undesirably affects water quality and wildlife. In some areas, water from rice farms treated with pesticides is discharged into other bodies of water to create environmentally unsafe conditions. In fact, legislation has been enacted in some of the southern states to control discharges of water from such chemically treated areas and to reduce or eliminate the use of these environmentally hazardous chemicals.

The conventional method of producing paddy rice in the United States is to aerially broadcast the rice seed over pre-cultivated and pre-flooded paddies. The rice paddy is normally flooded to a water level of one to four inches in depth prior to planting. Alternatively, a standard grain drill may be used to plant rice seeds into the upper section of the soil, prior to irrigation flushing or flooding with water. The water level is maintained throughout the growing season, except for brief periods when the paddy is drained to allow any required herbicide or pesticide treatment. After germination and emergence of the seedlings, the rice plants grow above the water level in the paddy. These procedures can be modified by soil cultivation after planting, transplantation of rice seedlings and by deeper flooding, which significantly reduce the use of herbicides and pesticides.

Currently, after planting and before germination, a fertilizer is usually applied to the rice paddy, either aerially or with equipment pulled by tractors. A nitrogen-containing fertilizer in amounts of 100 units or more per acre is generally incorporated into the soil. A starter fertilizer containing phosphorus is also often used. In former years, natural fertilizers such as manure composts were used in rice farming, but a reduced yield usually resulted and regulation of the harvest time was difficult to achieve. Over the years, urea (46% N, 0% S), monoammonium phosphate (12% N, 614 $P_2O_5$, 0% S), diammonium phosphate (21% N, 52% $P_2O_5$, 0% S), triple superphospahte (46% $P_2O_5$, 0% S) and various N-P-K solutions have been tried for fertilization of rice crops. However, these sulfur-free fertilizers fail to replenish the sulfur content of the soil removed with each harvest of the rice crop. The S-nutrient content of the soil is also lost from leaching-out processes that occur during preparation of the rice paddy. The end result is a serious shortage of sulfur in the soil, which is harmful to the rice crop. Further, nitrogen-free dressings of superphosphate (20% $P_2O_5$, 12% S) are ineffective by themselves for sustaining crop growth and generally provide the soil with more sulfur than is needed for growing rice. A better supplier of sulfur is ammonium sulfate (21% N, 24% S) since the sulfur is available in a form that can be readily taken up by the rice plant. However, nitrogen-containing ammonium sulfate, by itself, is ineffective for fertilizing purposes by reason of its low nitrogen content and relatively high sulfur content.

While many such natural and synthetic materials are known in the prior art for fertilization of field crops, there remains an important need for the development and application of selective fertilizers which are not only effective in artificially initiating and sustaining rice crop growth, but increasing the yield of this important food crop.

SUMMARY OF THE INVENTION

Accordingly, it is an object of the present invention to provide a method for improving the yield of field crops, especially rice, by application of a selective granular fertilizer which contains sufficient nitrogen and sulfur to initiate and sustain the growth of plants, particularly rice.

It is also an object of the invention to provide a method for growing and fertilizing rice that will result in satisfactory rice yields and yet eliminate or reduce the use of environmentally hazardous herbicides and pesticides.

An additional object of the present invention to provide a method of growing paddy rice by applying the selective fertilizer at relatively high rates during particular plant growth stages to make the fertilizer more readily available to the plant at times when fertilizer nutrients can be used to fullest advantage.

These and other objects are accomplished in accordance with the present invention which provides a method for increasing the yield of rice which comprises applying during the plant growth stage at relatively high rates a granular fertilizer consisting essentially of urea and ammonium sulfate in a urea/ammonium sulfate weight ratio of about 4/1. The fertilizer product employed according to the present method contains at least 40% nitrogen and at least 4% sulfur. Preferably, the product will contains from about 40% to 42% nitrogen and from about 4% to 5.5% sulfur. The most preferred formulation is 41-0-0-4S which indicates a product grade containing 41% nitrogen, no phosphorus, no potassium, and 4% sulfur.

The rate of foliar application of the fertilizer useful in the present invention is about 100 to 150 pounds per acre. This application rate is relatively high compared to that usually employed for fertilization of rice crops, so as to ensure that the fertilizer nutrients are always available to the rice plants at several stages of their growing period. As referred to herein, the term "growing period" is understood to mean the rice growth period normally from emergence to ripening of the rice crop in the form of grains or before the flowering stage.

The above advantages, as well as further objects and aspects of the present invention, will be more fully appreciated by reference to the following detailed description.

DETAILED DESCRIPTION OF THE INVENTION

The urea-ammonium sulfate fertilizer granules employed in the method of the present invention may be prepared by procedures well known in the art. The two components may be combined as a solution or melt in a urea/ammonium sulfate weight ratio of about 4/1 and then granulated and/or prilled at elevated temperatures. The product granules should have good mechanical characteristics and contain a homogeneous dispersion of very finely divided ammonium sulfate in urea containing from 40% to 42% nitrogen, no phosphorus or potassium and from 4% to 5.5% sulfur. Also, they should have a smooth, round surface, not exhibit any tendency to cake under humid conditions, and be readily capable of dispersion by aerial application or conventional ground equipment. The preferred grade fertilizer for purposes of the present invention is a 41-0-0-4S composition.

As noted above, the timing and rate of application of the selective fertilizer are added significant factors in achieving the increased rice yields of the present invention- There are approximately 21 weeks from planting to harvest of rice crops, and about 14 weeks in which the rice fields remain flooded. The initial application of fertilizer at a rate of about 100-150 pounds per acre is generally made about 2-4 weeks after planting or when the rice plants reach an average height of about three to four inches. Conveniently, this initial application is accomplish one to three days before permanent flooding. After about a 10-14 day interval, a second application of the fertilizer is made to the flooded rice paddy. This procedure continues until a total of about 400 to 600 pounds per acre of the fertilizer is applied to the rice plants during various stages of their growing period. Preferably, four applications of the fertilizer are made, with 10 to 12 days elapsing between each application. The rate of each application is about 125 pounds per acre, for an aggregate of 500 pounds of fertilizer being applied to the rice field. The final application is preferably applied just before (1-3 days before) the rice enters the flowering stage. Generally, no significant yield improvements result if the fertilizer is applied after the rice enters the flowering stage.

In order to eliminate or reduce the use of pesticides or herbicides during the growing season, the rice field is deep flooded (3-6 inches or more of water) and kept flooded until prior to harvest. Also, a cultivator which is capable of removing weeds without damaging the rice plants can be used before final flooding.

Application may be by any conventional means which provides uniform dispersal of the fertilizer granules such as a tractor-drawn spray system or other conventional ground or serial application system. Since the rice paddy remains flooded during most of the season, aerial application of the fertilizer by airplane is preferred.

The following example demonstrates the preferred embodiments of the present invention but are not intended to be limiting in any way. All parts and percentages are designated by weight unless otherwise indicated.

Example

In spring, rice was planted in Cleveland, Miss. after preparation of the seedbeds by plowing and leveling the field by triplaning. A grain drill is used to plant 100 pounds of rice seed per acre at a depth of two inches into the soil. After planing, the field is flush-irrigated and drained. Three weeks after planting, when the rice plants are 3-4 inches in height, weed seedlings also begin to emerge from the soil and cultivator is used to remove these weed plants. After cultivation and one day before flooding, granular urea/ammonium sulfate fertilizer (grade 41-0-0-4S) was aerially applied to the field at a rate of 125 pounds per acre. The entire field was then flooded to a water level of four to six inches and five weeks after planting, a second application of 41-0-0-4S fertilizer is aerially applied to the flooded rice paddy from an airplane at a rate of 125 pounds per acre. The field remained flooded throughout the growing season, during which a third and fourth application of 41-0-0-4S fertilizer (125 pounds/acre) was dispersed at two-week intervals, for a total of 500 pounds per acre of applied fertilizer. Approximately ten weeks after the final application of fertilizer, the rice crop is harvested to yield 151 bushels of dry rice per acre. The average yield for farm fields in the county using conventional rice growing methods that same year was only about 130 bushels per acre.

The results set forth hereinabove demonstrate a substantial rice yield increase by post-emergence application of the selective fertilizers utilized in the method of the present invention. Similar trials with various crops other than that specifically illustrated seem to indicate that similar beneficial results may be also be attained by the practice of the invention on such useful crops as corn, wheat and soybeans, to name a few. Therefore, those skilled in the art will appreciate that various changes and modifications can be made from the specific teachings of the present disclosure without departing from the spirit of the invention. Accordingly, the foregoing representative embodiments selected for illustration purposes are not to be interpreted as restrictive of the invention beyond that necessitated by the following claims.

I claim:

1. A method for increasing the yield of rice plants which comprises applying to said plants during the rice plant growth stage a granular fertilizer consisting essentially of urea and ammonium sulfate in a urea/ammonium sulfate weight ratio of about 4/1, at a rate of about 100 to about 150 pounds per acre.

2. The method according to claim 1 wherein the fertilizer consists essentially of about 40% to 42% nitrogen and from about 4% to 5.5% sulfur.

3. The method according to claim 2 wherein the fertilizer consists essentially of about 41% nitrogen and from about 4% sulfur.

4. The method according to claim 1 wherein said granular fertilizer has a grade analysis of 41-0-0-4S.

5. The method according to claim 1 wherein the rice plant growth stage includes a period from emergence in a paddy field to ripening of the rice crop.

6. The method according to claim 1 wherein the rice plant growth stage comprises a period before the rice enters the flowering stage.

7. The method according to claim 1 wherein the fertilizer is applied at a rate of about 125 pounds per acre by aerial application.

* * * * *